(12) United States Patent
Relan et al.

(10) Patent No.: US 12,539,068 B2
(45) Date of Patent: Feb. 3, 2026

(54) SYSTEM AND METHOD FOR MAPPING CARDIAC ACTIVITY

(71) Applicant: St. Jude Medical, Cardiology Division, Inc., St. Paul, MN (US)

(72) Inventors: Jatin Relan, Bordeaux (FR); Valtino X. Afonso, Oakdale, MN (US); Steven Kim, New York, NY (US)

(73) Assignee: St. Jude Medical, Cardiology Division, Inc., St. Paul, MN (US)

( * ) Notice: Subject to any disclaimer, the term of this patent is extended or adjusted under 35 U.S.C. 154(b) by 553 days.

(21) Appl. No.: 17/918,529

(22) PCT Filed: Apr. 20, 2021

(86) PCT No.: PCT/US2021/028215
§ 371 (c)(1),
(2) Date: Oct. 12, 2022

(87) PCT Pub. No.: WO2021/216589
PCT Pub. Date: Oct. 28, 2021

(65) Prior Publication Data
US 2023/0157619 A1    May 25, 2023

Related U.S. Application Data

(60) Provisional application No. 63/012,998, filed on Apr. 21, 2020.

(51) Int. Cl.
*A61B 5/367* (2021.01)
*A61B 5/00* (2006.01)
(Continued)

(52) U.S. Cl.
CPC .............. *A61B 5/367* (2021.01); *A61B 5/339* (2021.01); *A61B 5/347* (2021.01); *A61B 5/366* (2021.01); *A61B 5/726* (2013.01); *A61B 5/7264* (2013.01)

(58) Field of Classification Search
None
See application file for complete search history.

(56) References Cited

U.S. PATENT DOCUMENTS 5,697,377 A    12/1997  Wittkampf
5,983,126 A    11/1999  Wittkampf
(Continued)

OTHER PUBLICATIONS

Vega-Higuera et al., High Performance Volume Splatting for Visualization of Neurovascular Data, IEEE Visualization 2005 (Year: 2005).*

(Continued)

*Primary Examiner* — Carl H Layno
*Assistant Examiner* — Manolis Pahakis
(74) *Attorney, Agent, or Firm* — Wiley Rein LLP

(57) ABSTRACT

A plurality of electrophysiology (EP) data points, each including an electrogram signal, can be used to visualize cardiac activity. Each EP data point can be characterized as substrate or healthy, and a cloud map of the substrate EP data points can be generated. A graphical representation of the cloud map can be output in combination with a graphical representation of an electrophysiology map of the healthy EP data points. In alternative embodiments, the electrogram signals can be transformed into the wavelet domain, thereby computing a plurality of scalograms, and computing a wave function of each scalogram, thereby computing a plurality of wave functions. A propagation map, such as a propagation wave map and/or propagation wave trail map, can then be generated from the wave functions and output graphically.

7 Claims, 13 Drawing Sheets

(51) Int. Cl.
*A61B 5/339* (2021.01)
*A61B 5/347* (2021.01)
*A61B 5/366* (2021.01)

(56) References Cited

U.S. PATENT DOCUMENTS

| | | |
|---|---|---|
| 6,640,119 B1 | 10/2003 | Budd et al. |
| 6,728,562 B1 | 4/2004 | Budd et al. |
| 6,939,309 B1 | 9/2005 | Beatty et al. |
| 6,947,785 B1 | 9/2005 | Beatty et al. |
| 6,978,168 B2 | 12/2005 | Beatty et al. |
| 6,990,370 B1 | 1/2006 | Beatty et al. |
| 7,263,397 B2 | 8/2007 | Hauck et al. |
| 7,885,707 B2 | 2/2011 | Hauck |
| 8,137,343 B2 * | 3/2012 | Harlev ............. A61B 5/0536 600/509 |
| 9,610,023 B2 | 4/2017 | DuBois et al. |
| 11,103,177 B2 * | 8/2021 | Relan ................ A61B 5/0245 |
| 2015/0164356 A1 * | 6/2015 | Merschon ........... A61B 5/6852 600/374 |
| 2017/0135655 A1 * | 5/2017 | Wang ................. A61B 5/0035 |
| 2018/0137687 A1 * | 5/2018 | Katz ................. A61B 18/1492 |
| 2019/0320927 A1 * | 10/2019 | Relan ................ A61B 5/7253 |
| 2020/0146575 A1 | 5/2020 | Stewart et al. |
| 2020/0390353 A1 * | 12/2020 | Cohen ................ A61B 5/287 |
| 2021/0396661 A1 * | 12/2021 | Hendon ............. G01N 21/3563 |
| 2023/0157619 A1 * | 5/2023 | Relan ................ A61B 5/339 600/509 |
| 2024/0350070 A1 * | 10/2024 | Rodriguez ......... A61B 18/1206 |

OTHER PUBLICATIONS

International Search Report and Written Opinion of the International Searching Authority for International Application No. PCT/US2021/028215 dated Aug. 25, 2021.

* cited by examiner

SYSTEM AND METHOD FOR MAPPING CARDIAC ACTIVITY

CROSS-REFERENCE TO RELATED APPLICATION

This application claims benefit of U.S. provisional application No. 63/012,998, filed 21 Apr. 2020, which is hereby incorporated by reference as though fully set forth herein.

BACKGROUND

The present disclosure relates generally to electrophysiological visualization and mapping. More specifically, the present disclosure relates to a system, method, and apparatus for generating visualizations of cardiac activity.

Electrophysiological mapping, and more particularly electrocardiographic mapping, is a part of numerous cardiac diagnostic and therapeutic procedures. As the complexity of such procedures increases, however, the electrophysiology maps utilized must increase in quality, in density, and in the rapidity and ease with which they can be generated.

Electrophysiology studies can include the creation of a local activation time (LAT) map. LAT maps can, for example, provide insight to a practitioner as to how an arrhythmia is traveling throughout the cardiac chambers. Indeed, those of ordinary skill in the art will be familiar with the graphical presentation of LAT maps in electroanatomical mapping systems.

In general, however, only a single LAT can be computed for a given electrogram. This may not be desirable for complex electrograms with low amplitude and long and fractionated potentials, such as may be common in low-voltage myocardium.

BRIEF SUMMARY

Disclosed herein is a method of visualizing cardiac activity. The method includes: receiving a plurality of electrophysiology (EP) data points at an electroanatomical mapping system, wherein each EP data point of the plurality of EP data points includes an electrogram signal; the electroanatomical mapping system classifying a first subset of the plurality of EP data points as substrate EP data points and a second subset of the plurality of EP data points as healthy EP data points; the electroanatomical mapping system generating a cloud map of the first subset of the plurality of EP data points; and the electroanatomical mapping system outputting a graphical representation of the cloud map of the first subset of the plurality of EP data points in combination with a graphical representation of an electrophysiology map of the second subset of the plurality of EP data points.

In aspects of the disclosure, the electroanatomical mapping system classifies a given EP data point of the plurality of EP data points as a substrate EP data point when a QRS duration metric for the given EP data point exceeds a preset threshold and as a healthy EP data point otherwise.

The method can also include transforming the electrogram signal associated with the EP data point into the wavelet domain, thereby computing a scalogram, and computing a peak-frequency function of the scalogram. For instance, a continuous wavelet transformation can be applied to the electrogram signal to compute the scalogram. The continuous wavelet transformation can utilize a high time-resolution mother wavelet, such as a Paul wavelet.

According to aspects of the disclosure, the step of the electroanatomical mapping system generating a cloud map of the first subset of the plurality of EP data points includes the electroanatomical mapping system: applying a Gaussian splatting algorithm to the first subset of the plurality of EP data points to create a structured points dataset; and applying an iso-contouring algorithm to the structured points dataset.

Also disclosed herein is a method of visualizing cardiac activity. The method includes receiving a plurality of electrophysiology (EP) data points at an electroanatomical mapping system, wherein each EP data point of the plurality of EP data points includes an electrogram signal. The method also includes, for each EP data point of the plurality of EP data points, the electroanatomical mapping system: transforming the electrogram signal for the EP data point into the wavelet domain, thereby computing a scalogram; and computing a wave function of the scalogram, thereby computing a plurality of wave functions. The electroanatomical mapping system generates a propagation wave map from the plurality of wave functions and outputs graphical representation of the propagation wave map.

In embodiments of the disclosure, the step of transforming the electrogram signal for the EP data point into the wavelet domain comprises applying a continuous wavelet transformation to the electrogram signal to compute the scalogram. The continuous wavelet transformation can utilize a high time-resolution mother wavelet, such as a Paul wavelet.

The step of computing a wave function of the scalogram can include computing a peak-frequency function of the scalogram. In other embodiments, the step of computing a wave function of the scalogram can include computing a composite wave function of the scalogram.

The propagation wave map can include a propagation wave trail map and/or an interpolated propagation wave map.

Also disclosed herein is a system for visualizing cardiac activity including a visualization module configured to: receive a plurality of electrophysiology (EP) data points, wherein each EP data point of the plurality of EP data points includes an electrogram signal; classify a first subset of the plurality of EP data points as substrate EP data points and a second subset of the plurality of EP data points as healthy EP data points; generate a cloud map of the first subset of the plurality of EP data points; and output a graphical representation of the cloud map of the first subset of the plurality of EP data points in combination with a graphical representation of an electrophysiology map of the second subset of the plurality of EP data points.

The visualization module can be configured to generate the cloud map of the first subset of the plurality of EP data points by: applying a Gaussian splatting algorithm to the first subset of the plurality of EP data points to create a structured points dataset; and applying an iso-contouring algorithm to the structured points dataset.

The instant disclosure also provides a system for visualizing cardiac activity including a visualization module configured to: receive a plurality of electrophysiology (EP) data points, wherein each EP data point of the plurality of EP data points includes an electrogram signal; compute a plurality of wave functions from the plurality of EP data points; generate a propagation wave map from the plurality of wave functions; and output a graphical representation of the propagation wave map.

The visualization module can be configured to compute the plurality of wave functions from the plurality of EP data points by, for each EP data point of the plurality of EP data points: transforming the electrogram signal for the EP data point into the wavelet domain, thereby computing a scalogram; and computing a wave function of the scalogram.

The graphical representation of the propagation wave map can include at least one of a propagation wave trail map and an interpolated propagation wave map.

The foregoing and other aspects, features, details, utilities, and advantages of the present invention will be apparent from reading the following description and claims, and from reviewing the accompanying drawings.

While multiple embodiments are disclosed, still other embodiments of the present disclosure will become apparent to those skilled in the art from the following detailed description, which shows and describes illustrative embodiments. Accordingly, the drawings and detailed description are to be regarded as illustrative in nature and not restrictive.

DETAILED DESCRIPTION

The present disclosure provides systems and methods for the visualization of electrophysiology maps (e.g., electro-cardiographic maps). For purposes of illustration, several exemplary embodiments will be described in detail herein with reference to cardiac electrophysiology procedures. More specifically, aspects of the disclosure will be described in the context of the visualization of cardiac activity using electrophysiology (EP) data points collected using a high density (HD) grid catheter, such as the Advisor™ HD grid mapping catheter from Abbott Laboratories (Abbott Park, Illinois), in conjunction with an electroanatomical mapping system, such as the EnSite Precision™ cardiac mapping system, also from Abbott Laboratories. Those of ordinary skill in the art will understand, however, how to apply the teachings herein to good advantage in other contexts and/or with respect to other devices.

Figure 1:
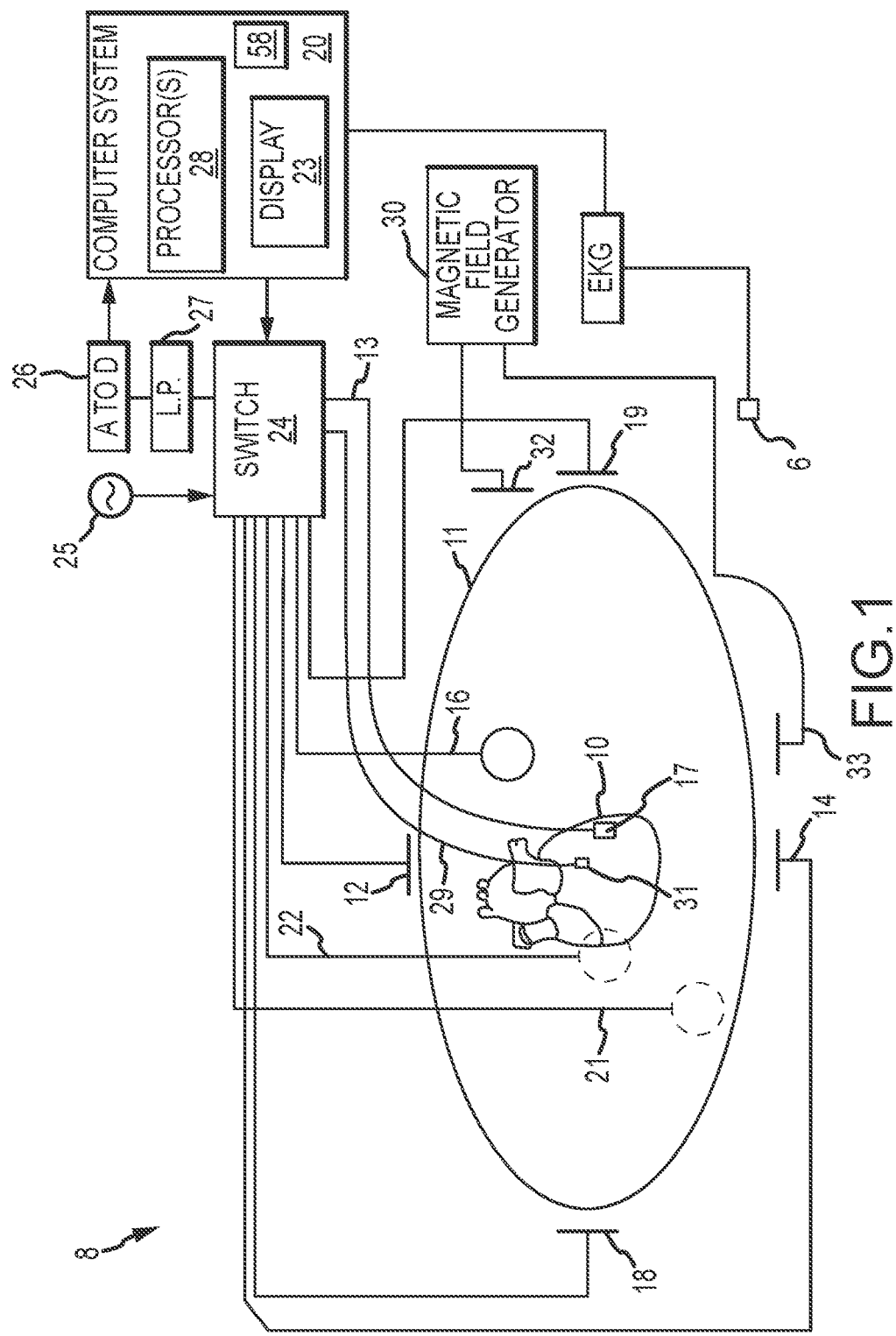
FIG. 1 is a schematic diagram of an exemplary electro-anatomical mapping system.

FIG. 1 shows a schematic diagram of an exemplary electroanatomical mapping system 8 for conducting cardiac electrophysiology studies by navigating a cardiac catheter and measuring electrical activity occurring in a heart 10 of a patient 11 and three-dimensionally mapping the electrical activity and/or information related to or representative of the electrical activity so measured. System 8 can be used, for example, to create an anatomical model of the patient's heart 10 using one or more electrodes. System 8 can also be used to measure electrophysiology data at a plurality of points along a cardiac surface and store the measured data in association with location information for each measurement point at which the electrophysiology data was measured, for example to create a diagnostic data map of the patient's heart 10.

As one of ordinary skill in the art will recognize, system 8 determines the location, and in some aspects the orientation, of objects, typically within a three-dimensional space, and expresses those locations as position information determined relative to at least one reference. This is referred to herein as "localization."

For simplicity of illustration, the patient 11 is depicted schematically as an oval. In the embodiment shown in FIG. 1, three sets of surface electrodes (e.g., patch electrodes) are shown applied to a surface of the patient 11, defining three generally orthogonal axes, referred to herein as an x-axis, a y-axis, and a z-axis. In other embodiments the electrodes could be positioned in other arrangements, for example multiple electrodes on a particular body surface. As a further alternative, the electrodes do not need to be on the body surface, but could be positioned internally to the body.

In FIG. 1, the x-axis surface electrodes 12, 14 are applied to the patient along a first axis, such as on the lateral sides of the thorax region of the patient (e.g., applied to the patient's skin underneath each arm) and may be referred to as the Left and Right electrodes. The y-axis electrodes 18, 19 are applied to the patient along a second axis generally orthogonal to the x-axis, such as along the inner thigh and neck regions of the patient, and may be referred to as the Left Leg and Neck electrodes. The z-axis electrodes 16, 22 are applied along a third axis generally orthogonal to both the x-axis and the y-axis, such as along the sternum and spine of the patient in the thorax region, and may be referred to as the Chest and Back electrodes. The heart 10 lies between these pairs of surface electrodes 12/14, 18/19, and 16/22.

An additional surface reference electrode (e.g., a "belly patch") 21 provides a reference and/or ground electrode for the system 8. The belly patch electrode 21 may be an alternative to a fixed intra-cardiac electrode 31, described in further detail below. It should also be appreciated that, in addition, the patient 11 may have most or all of the conventional electrocardiogram ("ECG" or "EKG") system leads in place. In certain embodiments, for example, a standard set of 12 ECG leads may be utilized for sensing electrocardiograms on the patient's heart 10. This ECG information is available to the system 8 (e.g., it can be provided as input to computer system 20). Insofar as ECG leads are well understood, and for the sake of clarity in the figures, only a single lead 6 and its connection to computer 20 is illustrated in FIG. 1.

A representative catheter 13 having at least one electrode 17 is also shown. This representative catheter electrode 17 is referred to as the "roving electrode," "moving electrode," or "measurement electrode" throughout the specification. Typically, multiple electrodes 17 on catheter 13, or on multiple such catheters, will be used. In one embodiment, for example, the system 8 may comprise sixty-four electrodes on twelve catheters disposed within the heart and/or vasculature of the patient. In other embodiments, system 8 may utilize a single catheter that includes multiple (e.g., eight) splines, each of which in turn includes multiple (e.g., eight) electrodes.

Figure 2:
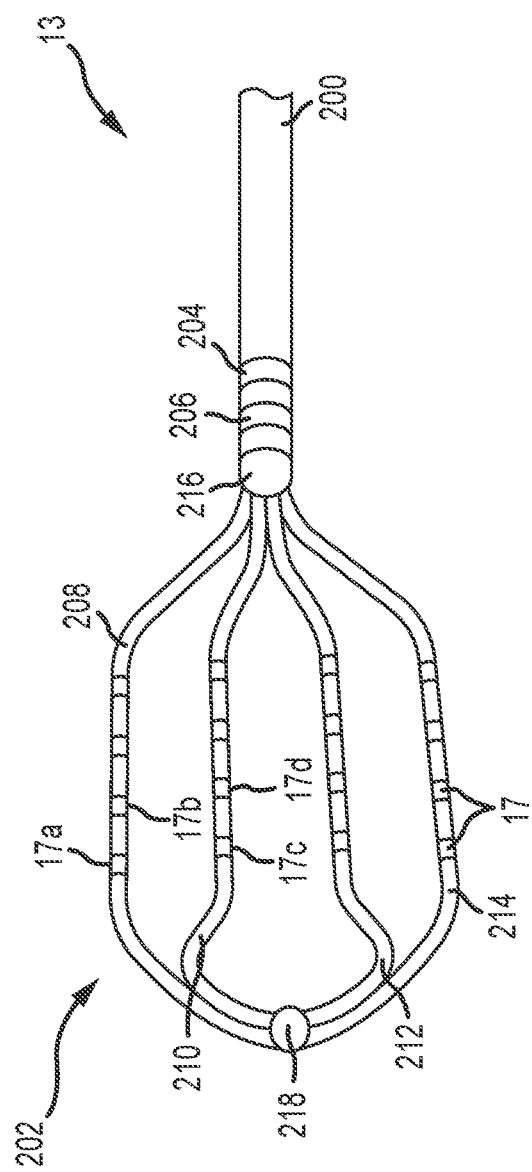
FIG. 2 depicts an exemplary catheter that can be used in connection with aspects of the instant disclosure.

The foregoing embodiments are merely exemplary, however, and any number of electrodes and/or catheters may be used. For example, for purposes of this disclosure, a segment of an exemplary multi-electrode catheter, and in particular an HD grid catheter, is shown in FIG. 2. HD grid catheter 13 includes a catheter body 200 coupled to a paddle 202. Catheter body 200 can further include first and second body electrodes 204, 206, respectively. Paddle 202 can include a first spline 208, a second spline 210, a third spline 212, and a fourth spline 214, which are coupled to catheter body 200 by a proximal coupler 216 and to each other by a distal coupler 218. In one embodiment, first spline 208 and fourth spline 214 can be one continuous segment and second spline 210 and third spline 212 can be another continuous segment. In other embodiments, the various splines 208, 210, 212, 214 can be separate segments coupled to each other (e.g., by proximal and distal couplers 216, 218, respectively). It should be understood that HD catheter 13 can include any number of splines; the four-spline arrangement shown in FIG. 2 is merely exemplary.

As described above, splines 208, 210, 212, 214 can include any number of electrodes 17; in FIG. 2, sixteen electrodes 17 are shown arranged in a four-by-four array. It should also be understood that electrodes 17 can be evenly and/or unevenly spaced, as measured both along and between splines 208, 210, 212, 214. For purposes of easy reference in this description, FIG. 3A provides alphanumeric labels for electrodes 17.

As those of ordinary skill in the art will recognize, any two neighboring electrodes 17 define a bipole. Thus, the 16 electrodes 17 on catheter 13 define a total of 42 bipoles —12 along splines (e.g., between electrodes 17*a* and 17*b*, or between electrodes 17*c* and 17*d*), 12 across splines (e.g., between electrodes 17*a* and 17*c*, or between electrodes 17*b* and 17*d*), and 18 diagonally between splines (e.g., between electrodes 17*a* and 17*d*, or between electrodes 17*b* and 17*c*).

Figure 3B:
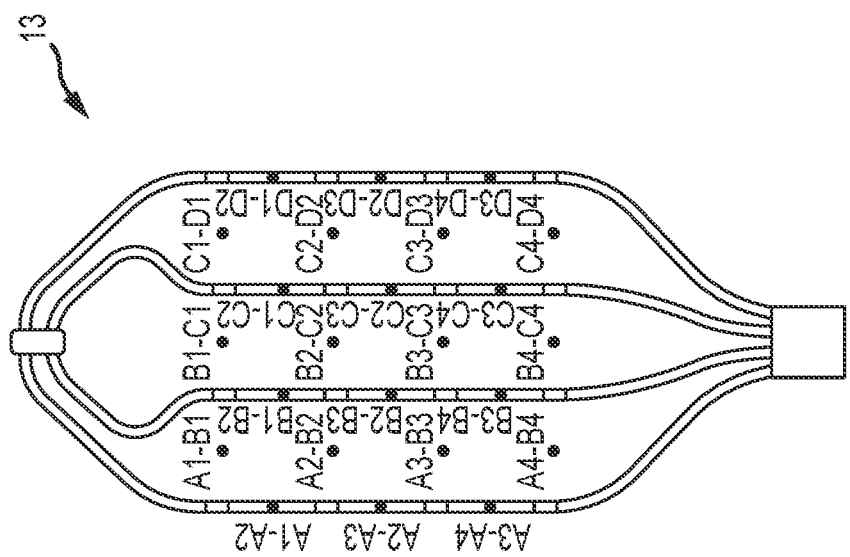
FIGS. 3A and 3B provide alphanumeric labeling conventions for electrodes carried by a multi-electrode catheter and the bipoles associated therewith.
Figure 3A:
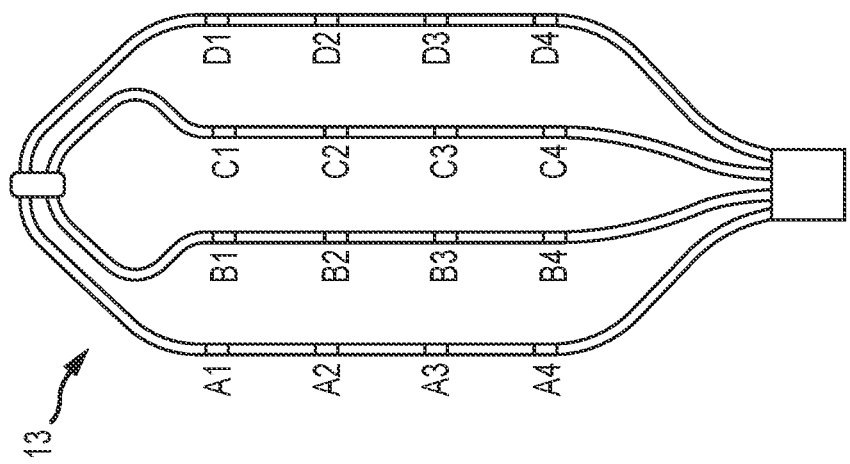

For ease of reference in this description, FIG. 3B provides alphanumeric labels for the along- and across-spline bipoles. FIG. 3B omits alphanumeric labels for the diagonal bipoles, but this is only for the sake of clarity in the illustration. It is expressly contemplated that the teachings herein can also be applied with respect to the diagonal bipoles.

Any bipole can, in turn, be used to generate a bipolar electrogram according to techniques that will be familiar to those of ordinary skill in the art. Moreover, these bipolar electrograms can be combined (e.g., linearly combined) to generate electrograms, again including activation timing information, in any direction of the plane of catheter 13 by computing an E-field loop for a clique of electrodes. U.S. application Ser. No. 15/953,155, which is hereby incorporated by reference as though fully set forth herein, discloses details of computing an E-field loop for a clique of electrodes on a HD grid catheter.

In any event, catheter 13 can be used to simultaneously collect a plurality of electrophysiology data points for the various bipoles defined by electrodes 17 thereon, with each such electrophysiology data point including both localization information (e.g., position and orientation of a selected bipole) and an electrogram signal for the selected bipole. For purposes of illustration, methods according to the instant disclosure will be described with reference to individual electrophysiology data points collected by catheter 13. It should be understood, however, that the teachings herein can be applied, in serial and/or in parallel, to multiple electrophysiology data points collected by catheter 13.

Catheter 13 (or multiple such catheters) are typically introduced into the heart and/or vasculature of the patient via one or more introducers and using familiar procedures. Indeed, various approaches to introduce catheter 13 into a patient's heart, such as transseptal approaches, will be familiar to those of ordinary skill in the art, and therefore need not be further described herein.

Since each electrode 17 lies within the patient, location data may be collected simultaneously for each electrode 17 by system 8. Similarly, each electrode 17 can be used to gather electrophysiological data from the cardiac surface (e.g., surface electrograms). The ordinarily skilled artisan will be familiar with various modalities for the acquisition and processing of electrophysiology data points (including, for example, both contact and non-contact electrophysiological mapping), such that further discussion thereof is not necessary to the understanding of the techniques disclosed herein. Likewise, various techniques familiar in the art can be used to generate a graphical representation of a cardiac geometry and/or of cardiac electrical activity from the plurality of electrophysiology data points. Moreover, insofar as the ordinarily skilled artisan will appreciate how to create electrophysiology maps from electrophysiology data points, the aspects thereof will only be described herein to the extent necessary to understand the present disclosure.

Returning now to FIG. 1, in some embodiments, an optional fixed reference electrode 31 (e.g., attached to a wall of the heart 10) is shown on a second catheter 29. For calibration purposes, this electrode 31 may be stationary (e.g., attached to or near the wall of the heart) or disposed in a fixed spatial relationship with the roving electrodes (e.g., electrodes 17), and thus may be referred to as a "navigational reference" or "local reference." The fixed reference electrode 31 may be used in addition or alternatively to the surface reference electrode 21 described above. In many instances, a coronary sinus electrode or other fixed electrode in the heart 10 can be used as a reference for measuring voltages and displacements; that is, as described below, fixed reference electrode 31 may define the origin of a coordinate system.

Each surface electrode is coupled to a multiplex switch 24, and the pairs of surface electrodes are selected by software running on a computer 20, which couples the surface electrodes to a signal generator 25. Alternately, switch 24 may be eliminated and multiple (e.g., three) instances of signal generator 25 may be provided, one for each measurement axis (that is, each surface electrode pairing).

The computer 20 may comprise, for example, a conventional general-purpose computer, a special-purpose computer, a distributed computer, or any other type of computer. The computer 20 may comprise one or more processors 28, such as a single central processing unit ("CPU"), or a plurality of processing units, commonly referred to as a parallel processing environment, which may execute instructions to practice the various aspects described herein.

Generally, three nominally orthogonal electric fields are generated by a series of driven and sensed electric dipoles (e.g., surface electrode pairs 12/14, 18/19, and 16/22) in order to realize catheter navigation in a biological conductor.

Alternatively, these orthogonal fields can be decomposed and any pairs of surface electrodes can be driven as dipoles to provide effective electrode triangulation. Likewise, the electrodes 12, 14, 18, 19, 16, and 22 (or any number of electrodes) could be positioned in any other effective arrangement for driving a current to or sensing a current from an electrode in the heart. For example, multiple electrodes could be placed on the back, sides, and/or belly of patient 11. Additionally, such non-orthogonal methodologies add to the flexibility of the system. For any desired axis, the potentials measured across the roving electrodes resulting from a predetermined set of drive (source-sink) configurations may be combined algebraically to yield the same effective potential as would be obtained by simply driving a uniform current along the orthogonal axes.

Thus, any two of the surface electrodes 12, 14, 16, 18, 19, 22 may be selected as a dipole source and drain with respect to a ground reference, such as belly patch 21, while the unexcited electrodes measure voltage with respect to the ground reference. The roving electrodes 17 placed in the heart 10 are exposed to the field from a current pulse and are measured with respect to ground, such as belly patch 21. In practice the catheters within the heart 10 may contain more or fewer electrodes than the sixteen shown, and each electrode potential may be measured. As previously noted, at least one electrode may be fixed to the interior surface of the heart to form a fixed reference electrode 31, which is also measured with respect to ground, such as belly patch 21, and which may be defined as the origin of the coordinate system relative to which system 8 measures positions. Data sets from each of the surface electrodes, the internal electrodes, and the virtual electrodes may all be used to determine the location of the roving electrodes 17 within heart 10.

The measured voltages may be used by system 8 to determine the location in three-dimensional space of the electrodes inside the heart, such as roving electrodes 17 relative to a reference location, such as reference electrode 31. That is, the voltages measured at reference electrode 31 may be used to define the origin of a coordinate system, while the voltages measured at roving electrodes 17 may be used to express the location of roving electrodes 17 relative to the origin. In some embodiments, the coordinate system is a three-dimensional (x,y,z) Cartesian coordinate system, although other coordinate systems, such as polar, spherical, and cylindrical coordinate systems, are contemplated.

As should be clear from the foregoing discussion, the data used to determine the location of the electrode(s) within the heart is measured while the surface electrode pairs impress an electric field on the heart. The electrode data may also be used to create a respiration compensation value used to improve the raw location data for the electrode locations as described, for example, in U.S. Pat. No. 7,263,397, which is hereby incorporated herein by reference in its entirety. The electrode data may also be used to compensate for changes in the impedance of the body of the patient as described, for example, in U.S. Pat. No. 7,885,707, which is also incorporated herein by reference in its entirety.

Therefore, in one representative embodiment, system 8 first selects a set of surface electrodes and then drives them with current pulses. While the current pulses are being delivered, electrical activity, such as the voltages measured with at least one of the remaining surface electrodes and in vivo electrodes, is measured and stored. Compensation for artifacts, such as respiration and/or impedance shifting, may be performed as indicated above.

In aspects of the disclosure, system 8 can be a hybrid system that incorporates both impedance-based (e.g., as described above) and magnetic-based localization capabilities. Thus, for example, system 8 can also include a magnetic source 30, which is coupled to one or more magnetic field generators. In the interest of clarity, only two magnetic field generators 32 and 33 are depicted in FIG. 1, but it should be understood that additional magnetic field generators (e.g., a total of six magnetic field generators, defining three generally orthogonal axes analogous to those defined by patch electrodes 12, 14, 16, 18, 19, and 22) can be used without departing from the scope of the present teachings. Likewise, those of ordinary skill in the art will appreciate that, for purposes of localizing catheter 13 within the magnetic fields so generated, catheter 13 can include one or more magnetic localization sensors (e.g., coils).

In some embodiments, system 8 is the EnSite™ Velocity™ or EnSite Precision™ cardiac mapping and visualization system of Abbott Laboratories. Other localization systems, however, may be used in connection with the present teachings, including for example the RHYTHMIA HDX™ mapping system of Boston Scientific Corporation (Marlborough, Massachusetts), the CARTO navigation and location system of Biosense Webster, Inc. (Irvine, California), the AURORA® system of Northern Digital Inc. (Waterloo, Ontario), Sterotaxis, Inc.'s NIOBE® Magnetic Navigation System (St. Louis, Missouri), as well as MediGuide™ Technology from Abbott Laboratories.

The localization and mapping systems described in the following patents (all of which are hereby incorporated by reference in their entireties) can also be used with the present invention: U.S. Pat. Nos. 6,990,370; 6,978,168; 6,947,785; 6,939,309; 6,728,562; 6,640,119; 5,983,126; and 5,697,377.

Aspects of the disclosure relate to electrophysiological mapping, and in particular to generating visualizations (that is, graphical representations) of cardiac activity. Such visualizations can be output, for example, on display 23. System 8 can therefore include a visualization module 58 that can be used to generate various electrophysiology maps, as disclosed herein, and to output the same (e.g., on display 23).

Figure 4:
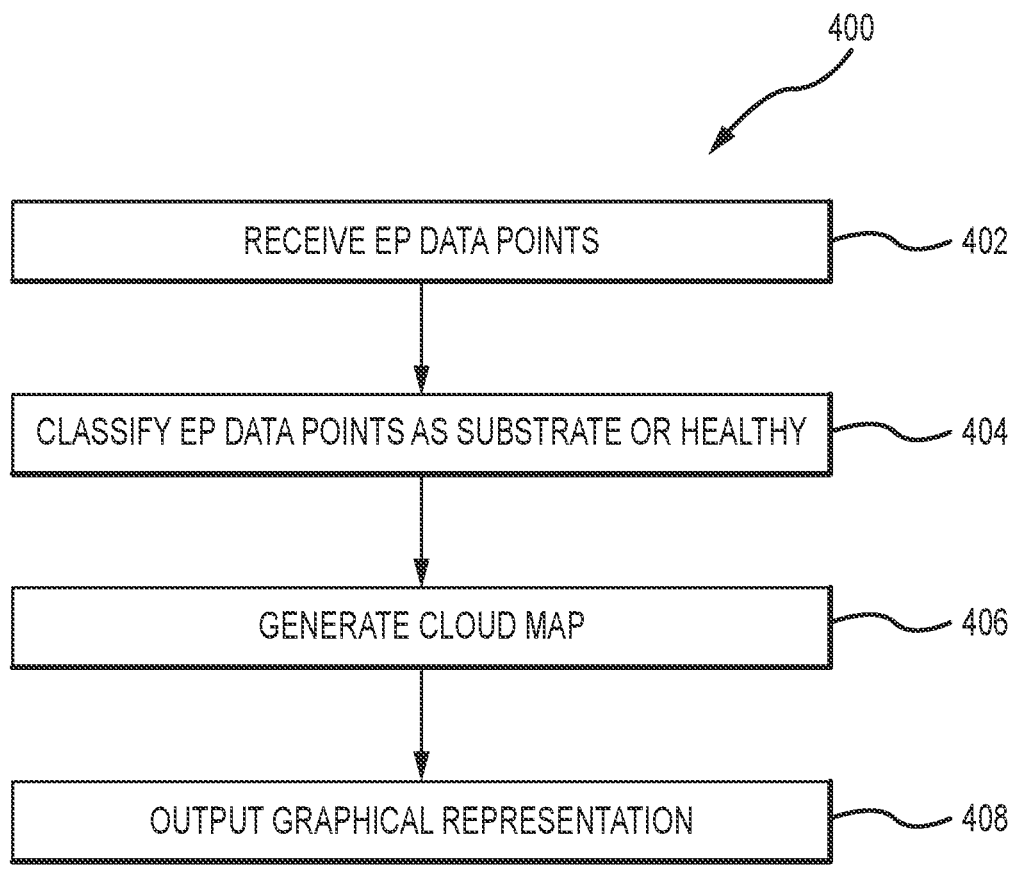
FIG. 4 is a flowchart of representative steps that can be carried out in generating a graphical representation of cardiac activity as cloud maps according to exemplary embodiments disclosed herein.

One exemplary method according to the present teachings will be explained with reference to the flowchart 400 of representative steps presented as FIG. 4. In some embodiments, for example, flowchart 400 may represent several exemplary steps that can be carried out by electroanatomical mapping system 8 of FIG. 1 (e.g., by processor 28 and/or visualization module 58). It should be understood that the representative steps described below can be either hardware- or software-implemented. For the sake of explanation, the term "signal processor" may be used herein to describe both hardware- and software-based implementations of the teachings herein.

In block 402, system 8 receives a plurality of electrophysiology (EP) data points, each of which includes both localization information and an electrogram signal. For instance, in embodiments of the disclosure, the localization information corresponds to the median position of catheter 13 during collection of the corresponding electrogram signal.

In block 404, system 8 classifies a first subset of the EP data points as substrate EP data points and a second subset of the EP data points as healthy EP data points. According to aspects of the disclosure, system 8 utilizes a QRS duration metric for the electrogram associated with a given EP data point in order to make the classification. For instance, system 8 can classify an EP data point as substrate if the QRS duration metric of its respective electrogram exceeds a preset (and, optionally, user-defined) threshold (e.g., about 100 ms), and as healthy otherwise. Additional details regarding the computation of QRS duration metrics for purposes of distinguishing substrate from healthy tissue can be found in U.S. application Ser. No. 16/294,313, which is hereby incorporated by reference as though fully set forth herein.

In block 406, system 8 generates a cloud map of the first subset of the plurality of EP data points (that is, the substrate EP data points). As described in further detail below, cloud maps can be either dynamic or static.

Figure 5:
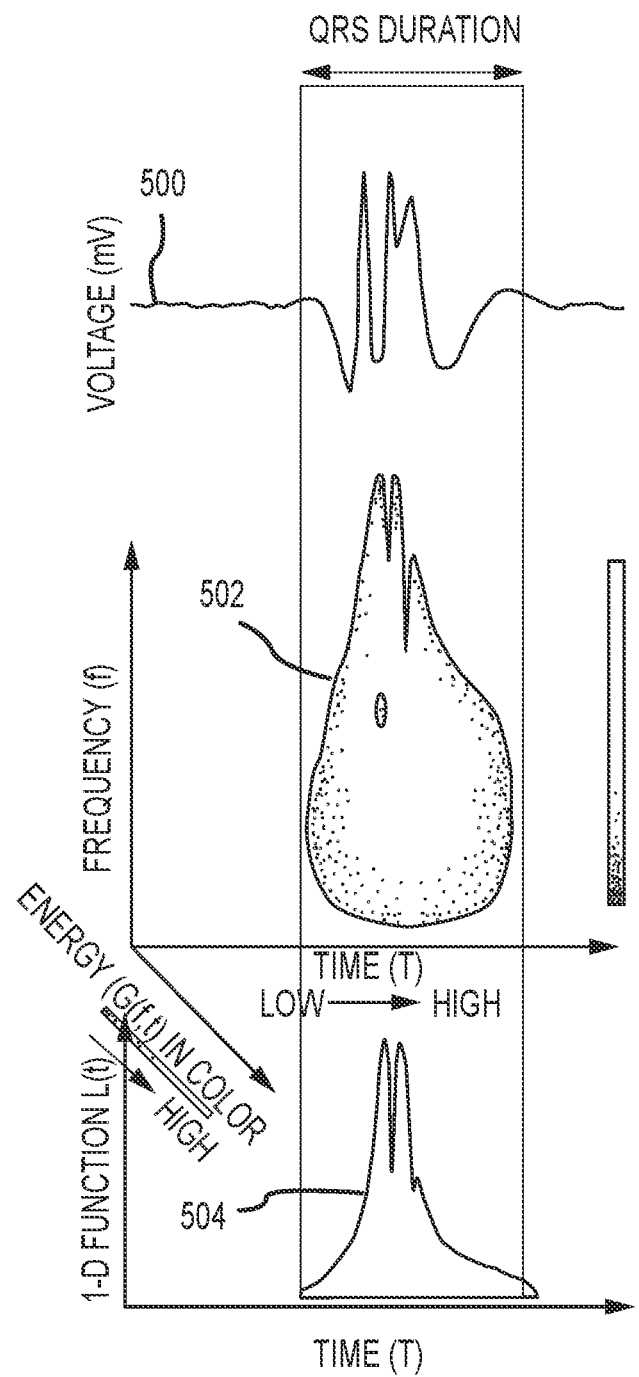
FIG. 5 illustrates the transformation of an electrogram signal into the wavelet domain and the computation of a peak-frequency function from the resulting scalogram.

For dynamic cloud maps, system 8 can transform the electrogram signal associated with each substrate EP data point into the wavelet domain, thereby computing a scalogram $G(f, t)$ of each electrogram signal. In embodiments of the disclosure, system 8 applies a continuous wavelet transformation to the electrogram signal using a high time-resolution mother wavelet, such as a Paul wavelet. FIG. 5 depicts transformation of an electrogram signal 500 into a wavelet domain scalogram 502.

Once the electrograms have been so transformed, system 8 can compute a peak-frequency function of the scalogram. According to aspects of the disclosure, the peak-frequency function of the scalogram is a one-dimensional energy function $L(t)=\max(f)$, if $G(f, t) > \text{Energy}^{Threshold}$, where $f$ ranges from about 0 Hz to about 1000 Hz and $\text{Energy}^{Threshold}$ is a preset (and optionally user-defined) noise threshold. In embodiments of the disclosure, the preset noise threshold is a normalized value of about 0.2. For purposes of illustration, FIG. 5 shows the peak-frequency function 504 of scalogram 502.

Whether for a static or dynamic cloud map, system 8 can generally execute two sub-steps to generate the cloud map in block 406. First, system 8 applies a Gaussian splatting algorithm to the first subset of EP data points. For instance, system 8 can apply the vtkGaussianSplatter algorithm (vtk.org), which is hereby incorporated by reference as though fully set forth herein. The vtkGaussianSplatter algorithm is a filter that injects input substrate EP data points into a structured points dataset. As each point is injected, it "splats"—that is, it distributes values to neighboring voxels in the structured points dataset according to a Gaussian distribution function. The Gaussian distribution function can be modified using scalar values, which expands the distribution, and/or normal/vectors, which creates an ellipsoidal distribution rather than a spherical distribution.

Generally, the Gaussian distribution function $f$ around a given substrate EP data point p is of form $$f(x) = ScaleFactor * \exp\left(ExponentFactor * \left(\left(\frac{r}{\text{Radius}}\right)^2\right)\right),$$

where x is the current voxel sample point, r is the absolute distance between x and p, ExponentFactor is less than or equal to zero, and ScaleFactor can be multiplied by the scalar value (e.g., the QRS duration) of p. This distribution is spherical.

If point normals are present, however, then the distribution becomes elliptical:

$$f(x) = ScaleFactor * \exp\left(ExponentFactor * \left(\frac{\left(\frac{rxy}{E}\right)^2 + z^2}{R^2}\right)\right),$$

where E is a preset (and, optionally, user-defined) eccentricity factor that controls the elliptical shape of the splat; z is the distance from x top along normal N, and rxy is the distance from x top in the direction perpendicular to normal N.

Next, system 8 applies an iso-contouring algorithm to the structured points dataset output by the Gaussian splatting algorithm. For instance, system 8 can apply the vtkContourFilter algorithm (vtk.org), which is hereby incorporated by reference as though fully set forth herein. The vtkContourFilter algorithm takes the structured points dataset as input and generates as output an isosurface at a preset (and, optionally, user-defined) substrate value (e.g., QRS duration of about 100 ms). The output isosurface is then rendered translucent, along with scalar map values derived from the substrate EP data points. This generates the cloud map; the intensity (e.g., the QRS duration) of the substrate can be represented using color, greyscale, or another suitable display convention.

In block 408, system 8 outputs the graphical representation of the cloud map (e.g., from the iso-contouring algorithm) in combination with a graphical representation of an electrophysiology map of the second subset of EP data points (e.g., the healthy EP data points).

Figure 6:
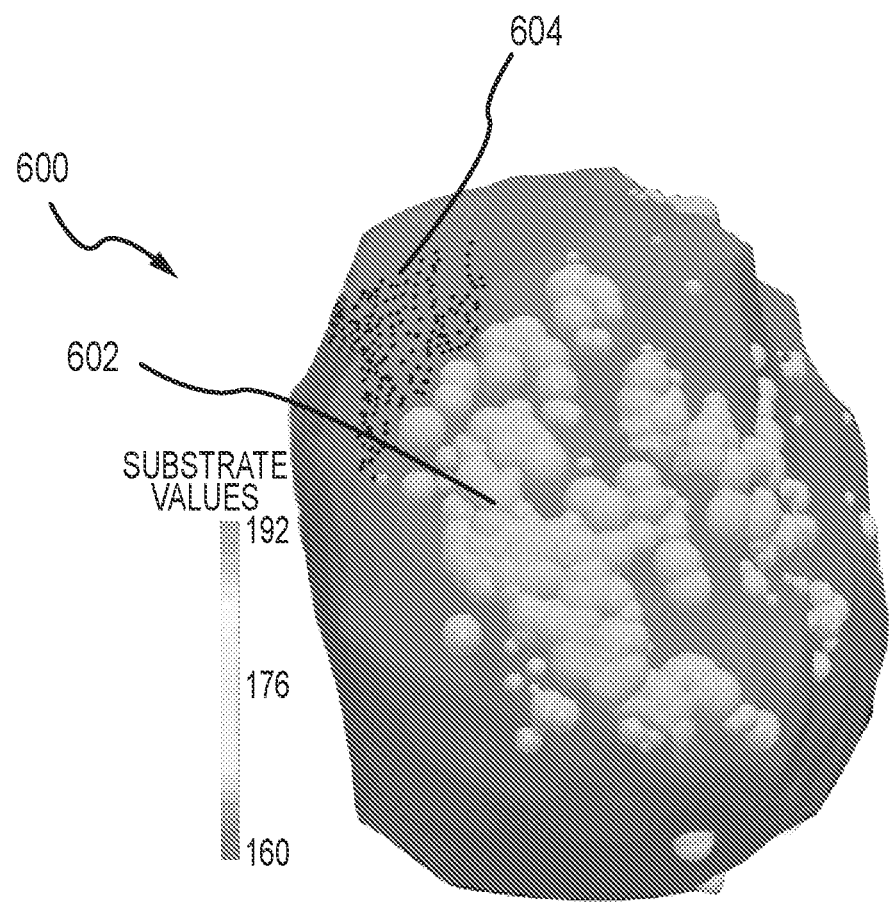
FIG. 6 illustrates a graphical representation of cardiac activity as a static cloud map.

FIG. 6 depicts a graphical representation 600 of a static cloud map. Substrate EP data points can be rendered with cloud scalar values 602, while healthy EP data points can be rendered more traditionally (e.g., black dots 604).

Figure 7:
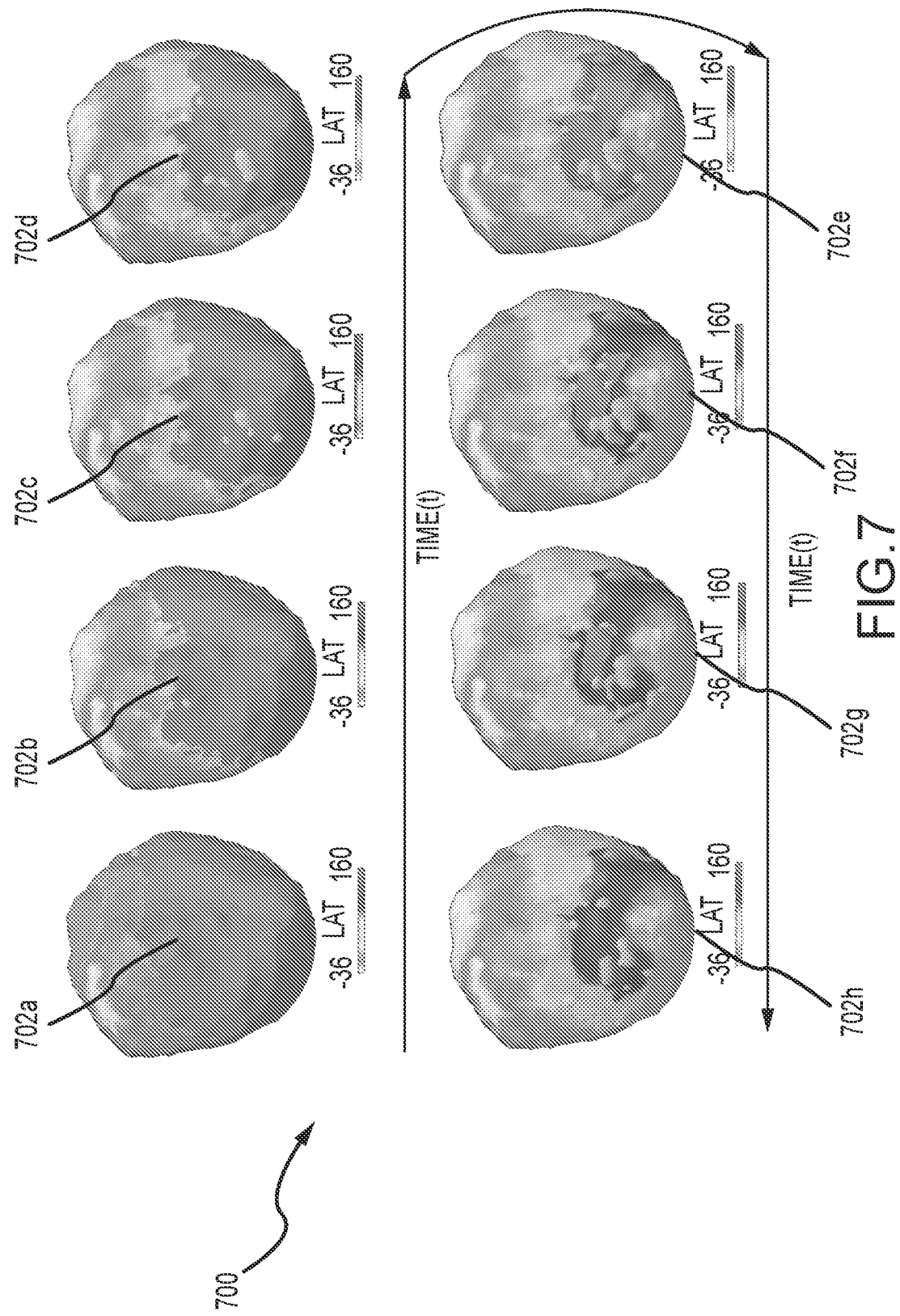
FIG. 7 illustrates a graphical representation of cardiac activity as a dynamic cloud map.

FIG. 7 depicts a graphical representation 700 of a dynamic cloud map (as a sequence of progressive static images 702a-702h). Substrate EP data points at any given time step of the sequence can be rendered with cloud scalar values (such as the peak frequency function value at the given time step), while healthy EP data points can be rendered as a familiar LAT map (e.g., as an activation wavefront).

Figure 8:
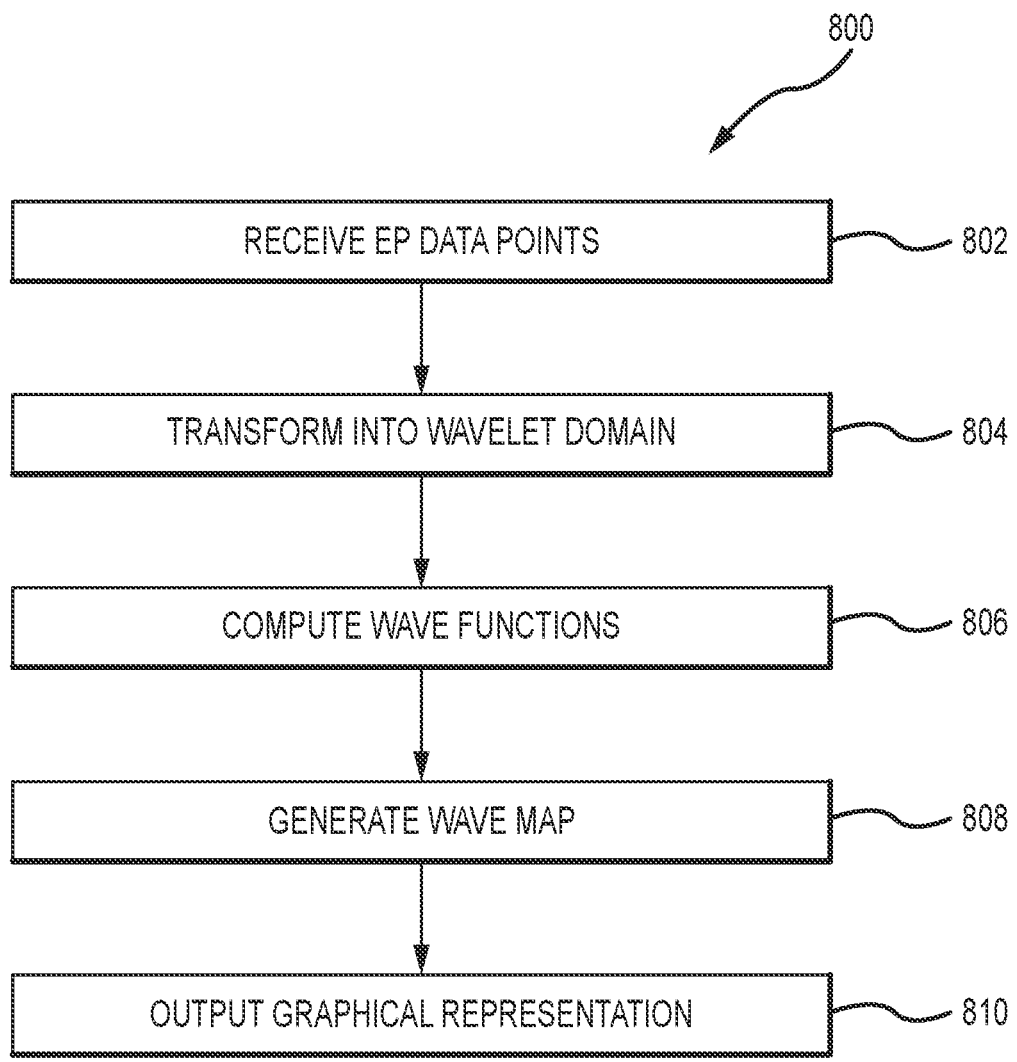
FIG. 8 is a flowchart of representative steps that can be carried out in generating a graphical representation of cardiac activity as a propagation wave according to exemplary embodiments disclosed herein.

Another exemplary method according to the present teachings will be explained with reference to the flowchart 800 of representative steps presented as FIG. 8. In some embodiments, for example, flowchart 800 may represent several exemplary steps that can be carried out by electroanatomical mapping system 8 of FIG. 1 (e.g., by processor 28 and/or visualization module 58). Once again, it should be understood that the representative steps described below can be either hardware- or software-implemented.

Block 802 is analogous to block 402, discussed above, and includes receipt by system 8 of a plurality of EP data points.

In block 804, system 8 transforms the electrogram signal for each EP data point into the wavelet domain, thereby computing a scalogram for each electrogram signal. The transformation of electrogram signals into the wavelet domain is described above in connection with the creation of dynamic cloud maps; block 804 is analogous.

Figure 9:
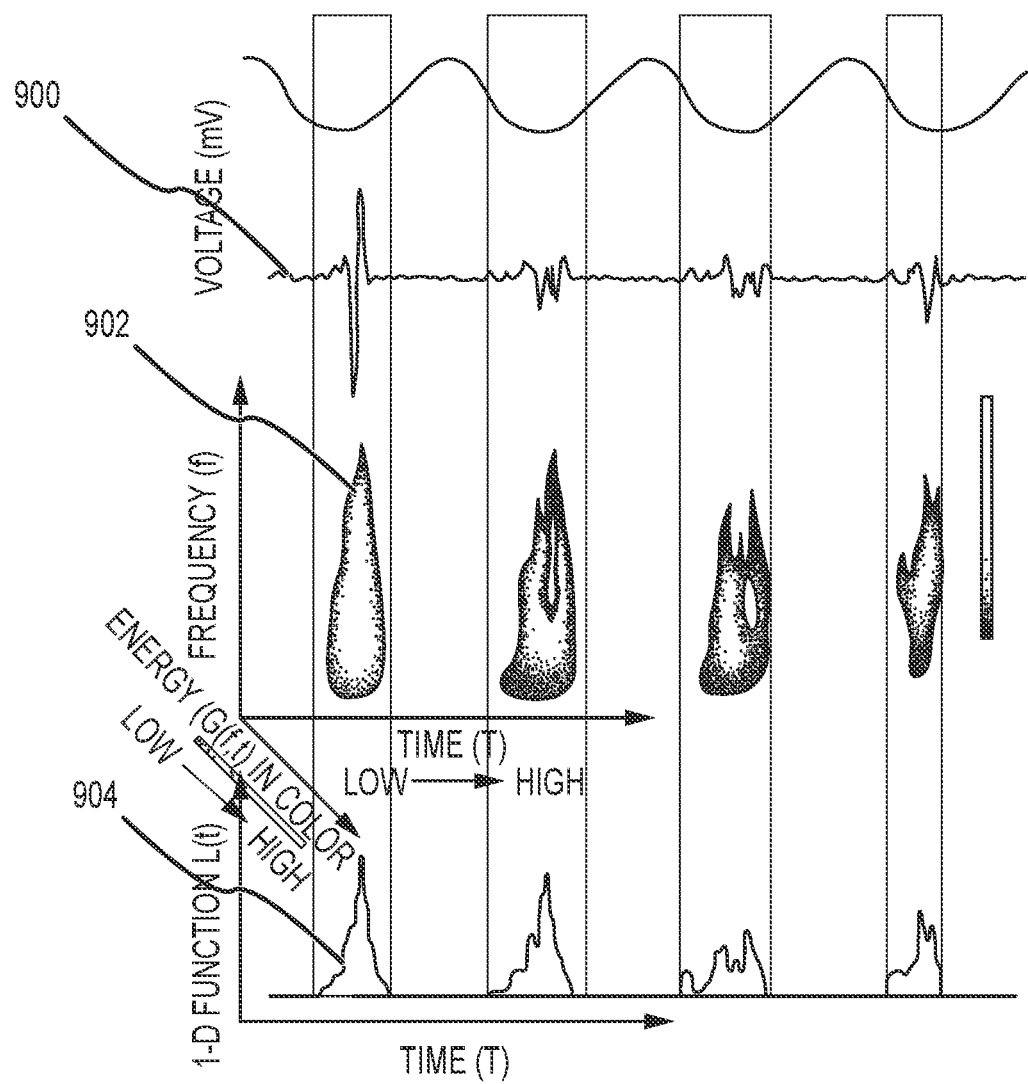
FIG. 9 illustrates the transformation of an electrogram signal into the wavelet domain and the computation of a peak-frequency function from the resulting scalogram.

In block 806, system 8 computes a wave function for each scalogram, thereby computing a plurality of wave functions. According to aspects of the disclosure, system 8 computes the wave function by computing a one-dimensional peak-frequency function of the scalogram as described above. In this regard, FIG. 9 illustrates the transformation of an electrogram signal 900 into a scalogram 902 and the corresponding one-dimensional peak frequency function 904. The wave function can correspond to the one-dimensional peak-frequency function. Alternatively, a composite wave function can be derived from the one-dimensional peak-frequency functions of neighboring electrograms (e.g., as the average such one-dimensional peak-frequency function, the maximum such one-dimensional peak-frequency function, the minimum such one-dimensional peak frequency function, or the sum of such one-dimensional peak-frequency functions).

In block 808, system 8 generates a propagation wave map from the plurality of wave functions, a graphical representation of which can be output in block 810 (e.g., in combination with a local activation time map, a substrate map, or the like). The instant disclosure contemplates both propagation wave trail maps and propagation wave maps.

Propagation Wave Trail Maps

For a propagation wave trail map, the leading edge of the propagation wave (e.g., the cardiac activation wavefront) is determined as the time point t* at each EP data point at which the corresponding wave function first goes above zero. For each such time point t*, discrete spherical glyphs are rendered, with the radius r of the glyph scaled by a factor c and the peak-frequency function L(t), such as $$r = c * \frac{L(t)}{1000}.$$

In embodiments of the disclosure, c=5, which renders glyphs of radius 0 cm to 5 cm for frequency ranges of about 0 Hz to about 1 kHz.

So rendered, the initial appearance of a glyph indicates the propagation wavefront. Trailing activity regions can be identified as areas where glyphs are slow to decay/disappear, or as areas where glyphs re-appear behind the leading edge of the propagation wave (e.g., in previously-activated regions).

Figure 10:
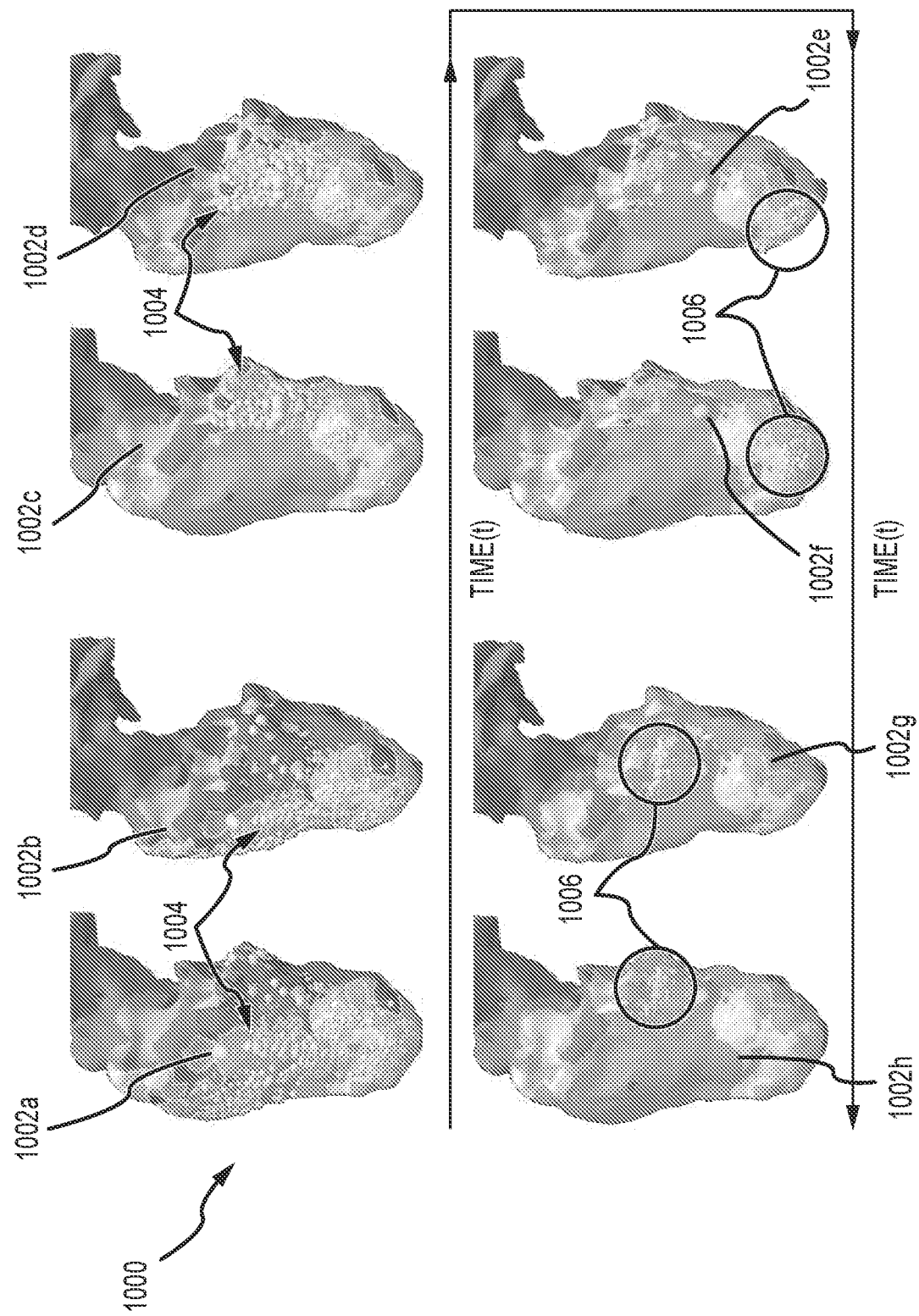
FIG. 10 represents a propagation wave trail map according to aspects disclosed herein.

FIG. 10 illustrates a graphical representation 1000 of a propagation wave trail map, in combination with a substrate map (e.g., a peak-to-peak voltage map), as a sequence of progressive static images 1002a-1002h. The leading edge 1004 of the propagation wave is annotated in images 1002a-1002d, while regions of trailing activity 1006 (that is, glyph regions behind the propagation wavefront) are annotated in images 1002e-1002h.

Propagation Wave Maps

For a propagation wave map, system 8 interpolates the wave function for each time point t* over the plurality of EP data points. Trailing activity regions can be identified as regions where the wave function yields more than one activation time.

Figure 11:
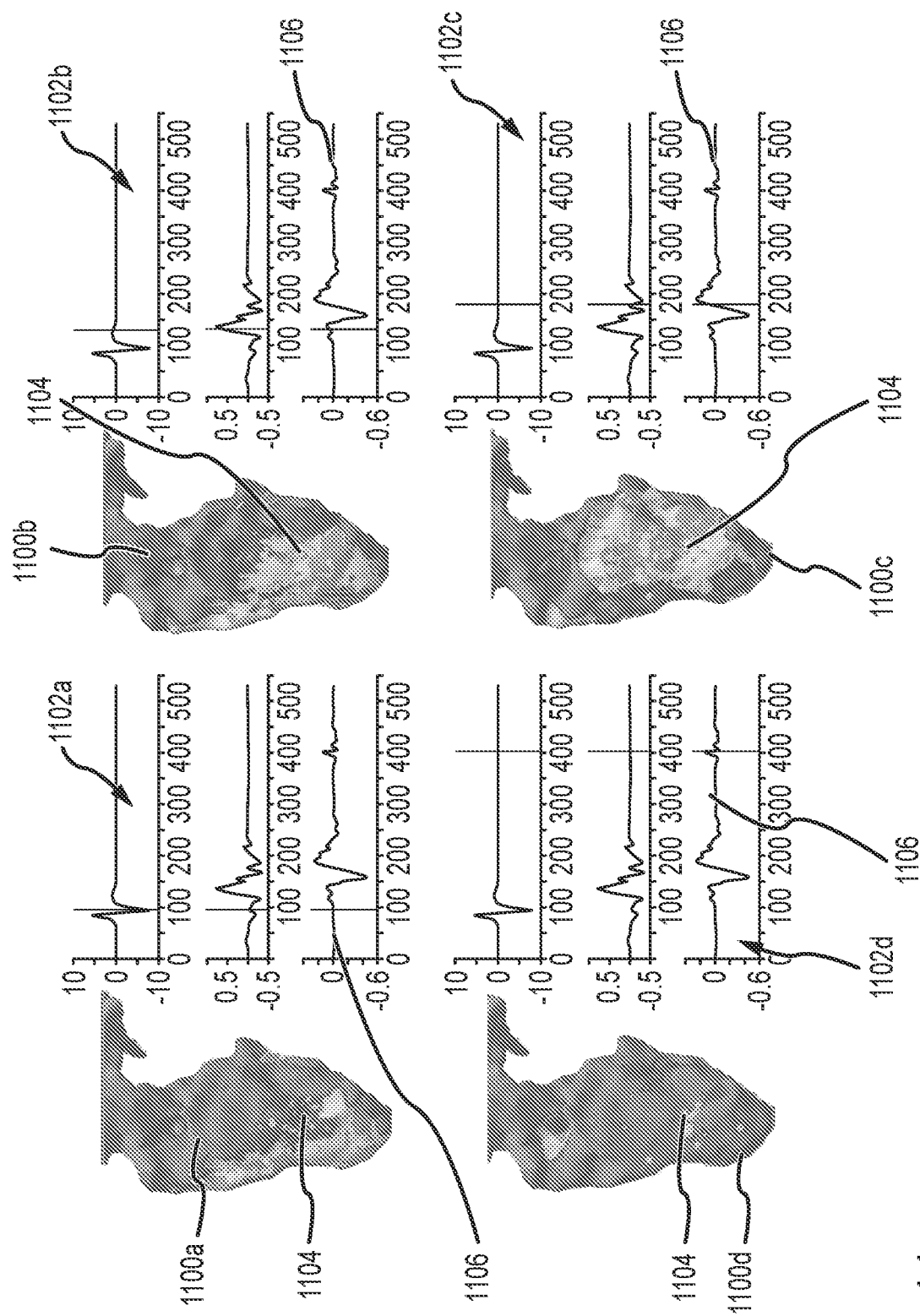
FIG. 11 represents a propagation wave map according to aspects disclosed herein.

For instance, FIG. 11 depicts a series of sequential propagation wave maps 1100a-1100d, as well as the corresponding electrogram traces 1102a-1102d from which propagation wave maps 1100a-1100d are derived. Point 1104, corresponding to electrogram trace 1106, exhibits trailing activity, showing a second activation in map 1100d.

Figure 12:
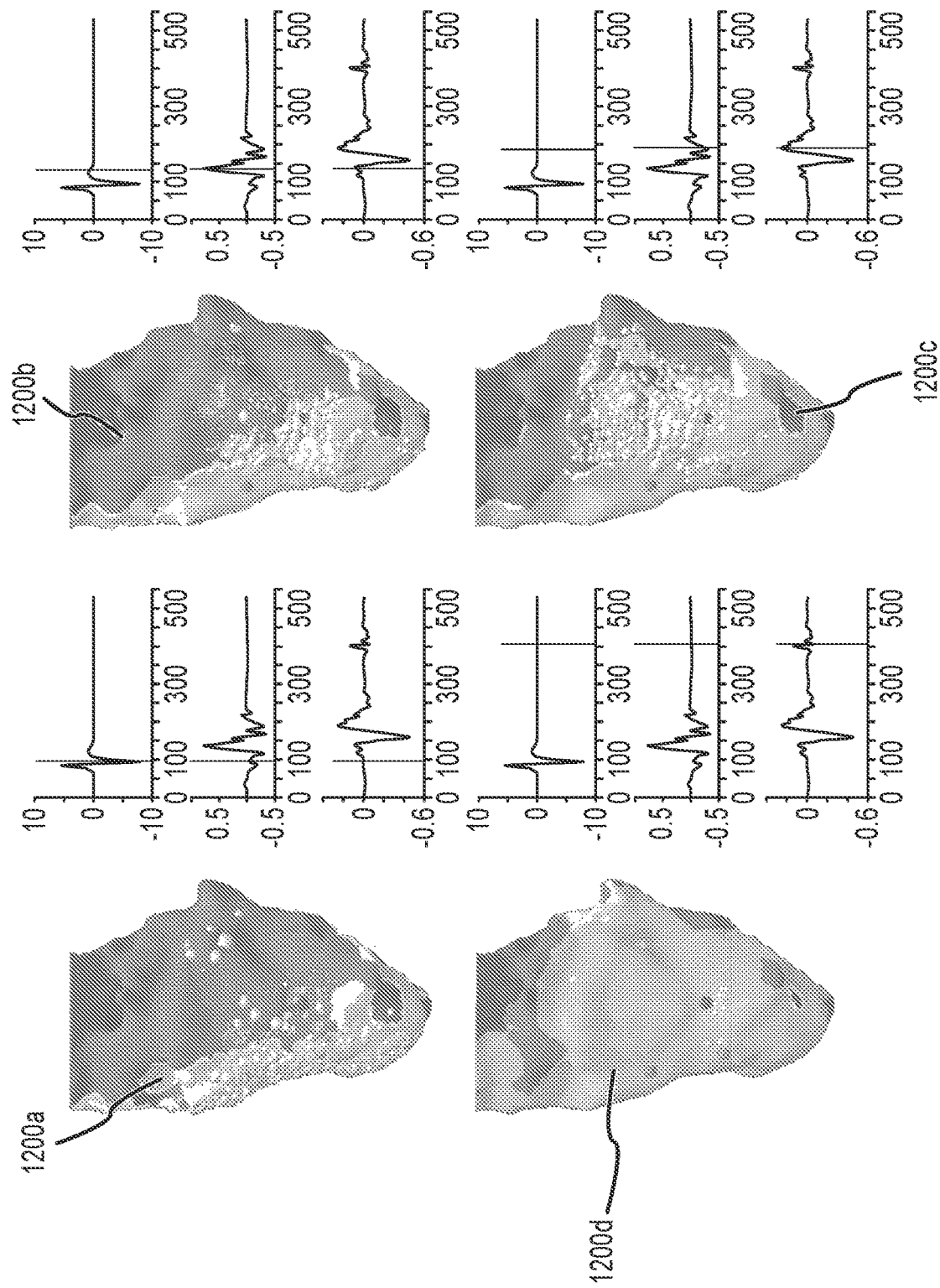
FIG. 12 depicts the data of FIG. 11 as a propagation wave trail map.

For the sake of comparative illustration, FIG. 12 depicts the same data as FIG. 11 rendered as a propagation wave trail map image series 1200a-1200d.

Although several embodiments have been described above with a certain degree of particularity, those skilled in the art could make numerous alterations to the disclosed embodiments without departing from the spirit or scope of this invention.

For example, the teachings herein can be applied in real time (e.g., during an electrophysiology study) or during post-processing (e.g., to electrophysiology data points collected during an electrophysiology study performed at an earlier time).

As another example, QRS duration metrics can be computed as composite QRS duration metrics over a user-defined spatial neighborhood or catheter electrode neighborhood. Thus, suitable QRS duration metrics include, without limitation, average QRS duration over a neighborhood, maximum QRS duration over a neighborhood, minimum QRS duration over a neighborhood, and sum of QRS duration over a neighborhood.

Figure 13:
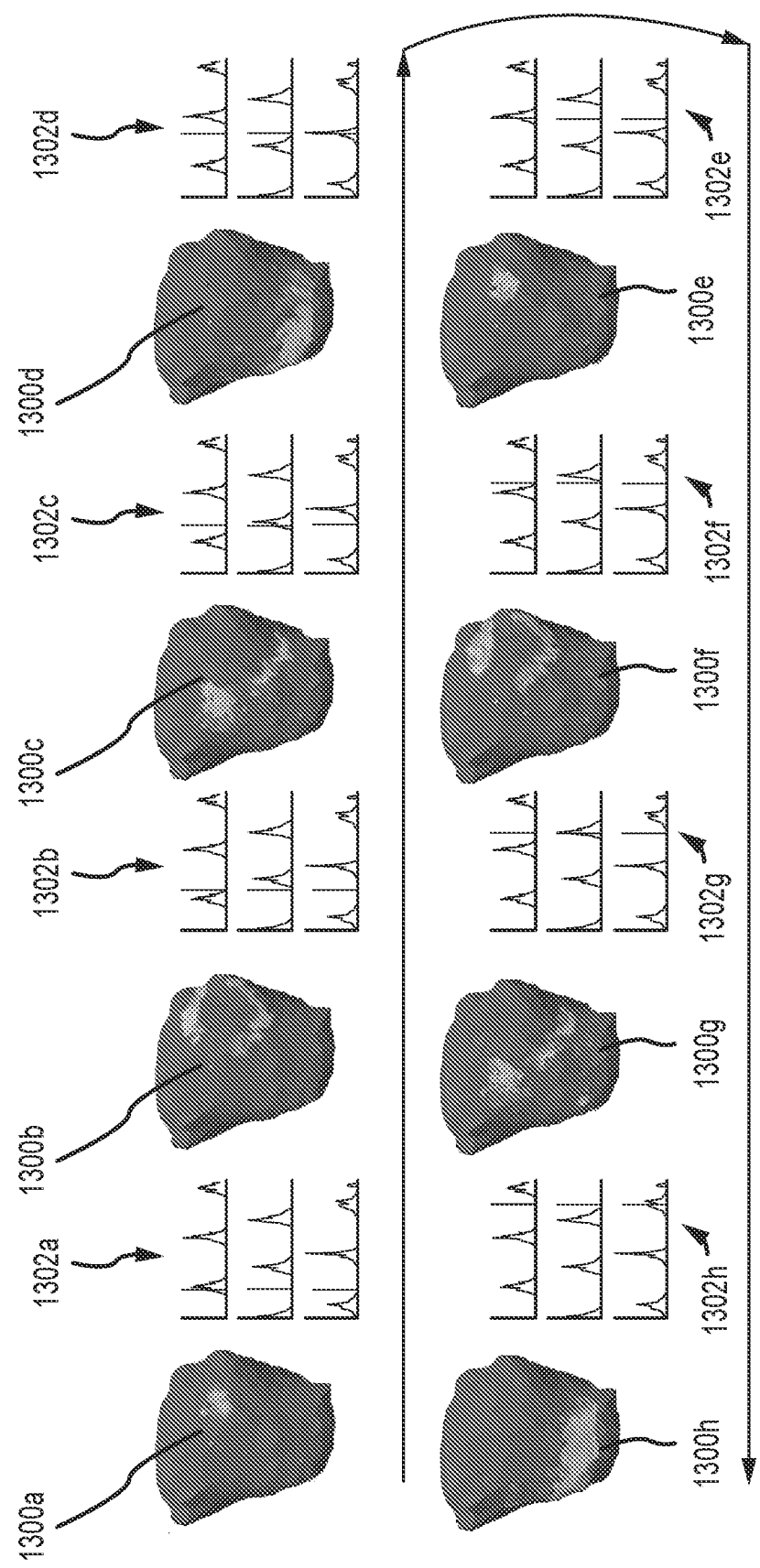
FIG. 13 illustrates a propagation map of two cycles of a tachycardia.

As still another example, the teachings herein can be used to visualize multiple cycles for a tachycardia as shown in FIG. 13. In particular, the top row of FIG. 13 shows a first cycle 1300a, 1300b, 1300c, 1300d moving left-to-right, while the bottom row of FIG. 13 shows a second cycle 1300e, 1300f, 1300g, 1300h moving right-to-left. Also shown are corresponding wave function traces 1302a-1302h for three points on the cardiac surface; in each wave function trace, the x-axis is time and the y-axis is the value of the wave function at time t (e.g., L(t)).

As yet a further example, static cloud maps can include additional metrics, such as fractionation or signal components.

All directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A method of visualizing cardiac activity, comprising:
receiving a plurality of electrophysiology (EP) data points at an electroanatomical mapping system, wherein each EP data point of the plurality of EP data points includes an electrogram signal;
classifying, via the electroanatomical mapping system, a first subset of the plurality of EP data points as substrate EP data points and a second subset of the plurality of EP data points as healthy EP data points;
generating, via the electroanatomical mapping system, a cloud map of the first subset of the plurality of EP data points by:
applying a Gaussian splatting algorithm to the first subset of the plurality of EP data points to create a structured points dataset; and
applying an iso-contouring algorithm to the structured points dataset; and
outputting, via the electroanatomical mapping system, a graphical representation of the cloud map of the first subset of the plurality of EP data points in combination with a graphical representation of an electrophysiology map of the second subset of the plurality of EP data points.

2. The method according to claim 1, wherein classifying, via the electroanatomical mapping system, a first subset of the plurality of EP data points as substrate EP data points and a second subset of the plurality of EP data points as healthy EP data points comprises classifying, via the electroanatomical mapping system, a given EP data point of the plurality of EP data points as a substrate EP data point when a QRS duration metric for the given EP data point exceeds a preset threshold and as a healthy EP data point otherwise.

3. The method according to claim 1, further comprising:
transforming, via the electroanatomical mapping system, the electrogram signal associated with the EP data point into the wavelet domain, thereby computing a scalogram; and
computing, via the electroanatomical mapping system, a peak-frequency function of the scalogram.

4. The method according to claim 3, wherein transforming, via the electroanatomical mapping system, the electrogram signal associated with the EP data point into the wavelet domain comprises applying a continuous wavelet transformation to the electrogram signal to compute the scalogram.

5. The method according to claim 3, wherein the continuous wavelet transformation utilizes a high time-resolution mother wavelet.

6. The method according to claim 5, wherein the high time-resolution mother wavelet comprises a Paul wavelet.

7. An electroanatomical mapping system for visualizing cardiac activity, comprising:
a display; and
a visualization module containing machine-readable instructions that, when executed, cause the electroanatomical mapping system to:
receive a plurality of electrophysiology (EP) data points, wherein each EP data point of the plurality of EP data points includes an electrogram signal;
classify a first subset of the plurality of EP data points as substrate EP data points and a second subset of the plurality of EP data points as healthy EP data points;
generate a cloud map of the first subset of the plurality of EP data points by:
applying a Gaussian splatting algorithm to the first subset of the plurality of EP data points to create a structured points dataset; and
applying an iso-contouring algorithm to the structured points dataset; and
output to the display a graphical representation of the cloud map of the first subset of the plurality of EP data points in combination with a graphical representation of an electrophysiology map of the second subset of the plurality of EP data points.

\* \* \* \* \*